(12) United States Patent
Smith et al.

(10) Patent No.: US 10,251,090 B2
(45) Date of Patent: Apr. 2, 2019

(54) SYSTEM AND METHOD FOR MODIFYING A WIRELESS COMMUNICATION OBJECT

(71) Applicant: Cubic Corporation, San Diego, CA (US)

(72) Inventors: Gavin Smith, Crawley (GB); Gavin Bennett, Hockley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/919,913

(22) Filed: Mar. 13, 2018

(65) Prior Publication Data

US 2018/0270709 A1 Sep. 20, 2018

Related U.S. Application Data

(60) Provisional application No. 62/471,302, filed on Mar. 14, 2017.

(51) Int. Cl.
*H04W 4/24* (2018.01)
*H04W 28/08* (2009.01)
(Continued)

(52) U.S. Cl.
CPC ........ *H04W 28/08* (2013.01); *G06Q 20/3224* (2013.01); *H04M 15/00* (2013.01);
(Continued)

(58) Field of Classification Search
CPC .......................... H04W 28/08; G06Q 30/0215
(Continued)

(56) References Cited

U.S. PATENT DOCUMENTS

2008/0201212 A1    8/2008   Hammad et al.
2011/0208645 A1    8/2011   Knauft et al.
(Continued)

FOREIGN PATENT DOCUMENTS

WO        02/19685 A2    3/2002

OTHER PUBLICATIONS

International Search Report and Written Opinion dated May 25, 2018 for PCT/US2018/022332; all pages.

*Primary Examiner* — Allyson N Trail
(74) *Attorney, Agent, or Firm* — Kilpatrick Townsend & Stockton

(57) ABSTRACT

Systems and methods for modifying a wireless communication object during transit. One method includes transmitting, by a loop antenna within a first reader at a first location within a transit system, an interrogation signal to the wireless communication object. The wireless communication object may receive the interrogation signal, modulate an electromagnetic wireless signal with information identifying the electromagnetic wireless object, and transit the electromagnetic wireless signal. The first reader may receive, using the loop antenna, the electromagnetic wireless signal at a first time and a first tap of the wireless communication object may be registered. In response to registering the first tap, a first amount of units on the wireless communication object may be held as unavailable. For each passage of a predetermined amount of time after the first time, a virtual tap of the wireless communication object may be registered at an update time.

20 Claims, 12 Drawing Sheets

(51) Int. Cl.
*G06K 7/10* (2006.01)
*H04W 88/06* (2009.01)
*H04W 76/11* (2018.01)
*H04W 4/80* (2018.01)
*G06Q 20/32* (2012.01)
*H04M 15/00* (2006.01)
*H04B 5/00* (2006.01)
*G07C 9/00* (2006.01)
*H04W 4/021* (2018.01)

(52) U.S. Cl.
CPC ........... *H04M 15/57* (2013.01); *H04M 15/66* (2013.01); *H04M 15/8228* (2013.01); *H04W 4/24* (2013.01); *H04W 4/80* (2018.02); *H04W 76/11* (2018.02); *H04W 88/06* (2013.01); *G06Q 20/3278* (2013.01); *G07C 9/00* (2013.01); *H04B 5/0062* (2013.01); *H04W 4/021* (2013.01)

(58) Field of Classification Search
USPC ......................................................... 235/382
See application file for complete search history.

(56) References Cited

U.S. PATENT DOCUMENTS

| | | |
|---|---|---|
| 2014/0008433 A1 | 1/2014 | Hammad et al. |
| 2016/0012465 A1* | 1/2016 | Sharp ................... G06Q 20/18 705/14.17 |
| 2017/0148241 A1* | 5/2017 | Kerning ................. H04W 4/12 |
| 2018/0197017 A1* | 7/2018 | Mansour ............ G06K 9/00778 |

* cited by examiner

| Start | End | Units |
|---|---|---|
| D3 | A1 | 3.00 |
| D3 | A2 | 4.00 |
| D3 | A3 | 5.00 |
| D3 | A4 | 6.00 |
| D3 | A5 | 7.00 |
| D3 | A6 | 8.00 |
| D3 | A7 | 9.00 |
| D3 | A8 | 10.00 |
| D3 | A9 | 11.00 |
| D3 | B1 | 9.00 |
| D3 | B2 | 10.00 |
| D3 | B3 | 11.00 |
| D3 | B4 | 12.00 |
| D3 | B5 | 13.00 |
| D3 | C1 | 5.00 |
| D3 | C2 | 6.00 |
| D3 | C3 | 7.00 |
| D3 | C4 | 8.00 |
| D3 | C5 | 9.00 |
| D3 | D1 | 2.00 |
| D3 | D2 | 1.00 |
| D3 | D3 | 0.00 |
| D3 | D4 | 1.00 |
| D3 | D5 | 2.00 |
| D3 | E1 | 3.00 |
| D3 | E2 | 4.00 |
| D3 | E3 | 5.00 |
| D3 | E4 | 6.00 |
| D3 | E5 | 7.00 |
| D3 | F1 | 3.00 |
| D3 | F2 | 4.00 |
| D3 | F3 | 5.00 |
| D3 | F4 | 6.00 |
| D3 | F5 | 7.00 |
| D3 | F6 | 8.00 |

| Start | End | Units |
|-------|-----|-------|
| D3 | A9 | 11.00 |
| D3 | B5 | 13.00 |
| D3 | C5 | 9.00 |
| D3 | D5 | 2.00 |
| D3 | E5 | 7.00 |
| D3 | F6 | 8.00 |

700

SYSTEM AND METHOD FOR MODIFYING A WIRELESS COMMUNICATION OBJECT

CROSS-REFERENCES TO RELATED APPLICATIONS

This Application claims priority to U.S. Provisional Patent Application No. 62/471,302 filed Mar. 14, 2017, the entire disclosure of which is hereby incorporated by reference, for all purposes, as if fully set forth herein.

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated wireless communication objects presents an appealing approach for managing such overcrowding. Unfortunately, existing devices and approaches are insufficient to alleviate these problems. Accordingly, new systems, methods, and other techniques are needed.

BRIEF SUMMARY OF THE INVENTION

In a first aspect of the present disclosure, a method for modifying a wireless communication object during transit is provided. The method may include transmitting, by a loop antenna within a first reader at a first location within a transit system, an interrogation signal to the wireless communication object. The method may also include receiving, by the wireless communication object, the interrogation signal. The method may further include modulating, by the wireless communication object, an electromagnetic wireless signal with information identifying the wireless communication object. In some embodiments, the method includes transmitting, by the wireless communication object, the modulated electromagnetic wireless signal to the first reader. The method may also include receiving, by the loop antenna within the first reader, the electromagnetic wireless signal at a first time. The method may further include registering a first tap of the wireless communication object upon receiving the electromagnetic wireless signal. In some embodiments, the method includes in response to registering the first tap, reserving a first allocation of units on the wireless communication object. The method may also include for each passage of a predetermined amount of time after the first time: registering a virtual tap of the wireless communication object at an update time, determining an updated allocation of units, and reserving the updated allocation of units on the wireless communication object. In the first aspect of the present disclosure, reserving an allocation of units causes the allocation of units to be unusable by a concurrent or future procedure.

In a second aspect of the present disclosure, a method for modifying a wireless communication object during transit is provided. The method may include registering a first tap of the wireless communication object by reading the wireless communication object at a first location within a transit system at a first time. The method may also include in response to registering the first tap, holding a first amount of units as unavailable on the wireless communication object. The method may further include for each passage of a predetermined amount of time after the first time: registering a virtual tap of the wireless communication object at an update time, determining an updated amount of units, and holding the updated amount of units as unavailable on the wireless communication object. In some embodiments, the method includes registering a final tap of the wireless communication object by reading the wireless communication object at a final location within the transit system at a final time, determining a deletion amount based on the first location and the final location, and causing the deletion amount to be deleted from the wireless communication object.

In some embodiments, the method includes determining a maximum amount of units based on the first location within the transit system, and for each passage of the predetermined amount of time from the first time, determining whether the updated amount of units is greater than the maximum amount of units, and in response to determining that the updated amount of units is greater than the maximum amount of units, decreasing the updated amount of units to the maximum amount of units. In some embodiments, determining the maximum amount of units based on the first location within the transit system includes determining a plurality of final locations within the transit system based on the first location, determining a plurality of fares between the first location and the plurality of final locations, and setting the maximum amount of units equal to the maximum of the plurality of fares. In some embodiments, registering the first tap of the wireless communication object includes storing the first location, the first time, and an identifier corresponding to the wireless communication object in a first entry at a data store, and registering the virtual tap of the wireless communication object includes storing the update time and the identifier corresponding to the wireless communication object in an update entry at the data store. In some embodiments, the update entry does not include a location within the transit system.

In some embodiments, the predetermined amount of time is 30 minutes such that the virtual tap of the wireless communication object is registered every 30 minutes after the first time. In some embodiments, reading the wireless communication object at the first location includes receiving, by an antenna within a first reader at the first location, an electromagnetic wireless signal. In some embodiments, the electromagnetic wireless signal is modulated by the wireless communication object with information identifying the wireless communication object. In some embodiments, the method includes transmitting, by the antenna, an interrogation signal to the wireless communication object. In some embodiments, the interrogation signal causes the wireless communication object to transmit the modulated electromagnetic wireless signal. In some embodiments, the wireless communication object is a fare media issued by the transit system. In some embodiments, the wireless communication object is a mobile electronic device.

In a third aspect of the present disclosure, a system for modifying a wireless communication object during transit is provided. The system may include one or more processors. The system may also include one or more computer readable storage mediums comprising instructions that, when executed by the one or more processors, cause the one or more processors to perform operations comprising the method described above in reference to the first aspect of the present disclosure or the method described above in reference to the second aspect of the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 5A and 5B illustrate a method for determining the maximum amount of units that may be used by a transit user based on a current location within a transit system, according to an embodiment of the present disclosure.

DETAILED DESCRIPTION OF THE INVENTION

Embodiments of the present disclosure include systems, methods, and other techniques for modifying a wireless communication object during transit. In one instance, the wireless communication object may be modified by holding an amount of units associated with the wireless communication object as unavailable. The wireless communication object may directly include one or more units (e.g., stored within the wireless communication object) or may indirectly include one or more units (e.g., the wireless communication object may include information linking to an external location where the units are stored). When the units are stored within the wireless communication object, their total amount may be tracked using a voltage, a current, a resistance, a capacitance, an inductance, among other possibilities. In some embodiments, the units may allow a holder of the wireless communication object to access a transit system.

Figure 1:
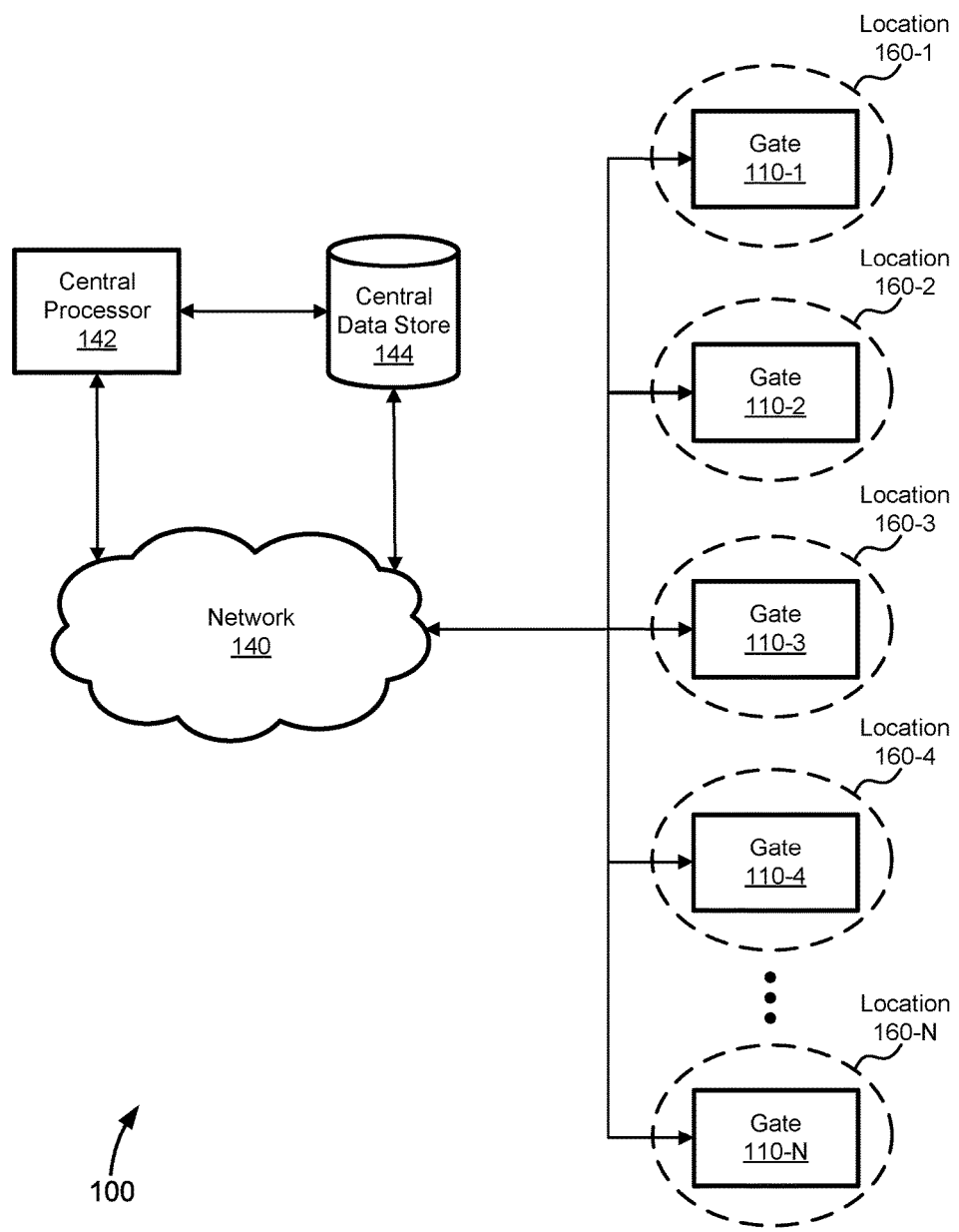
FIG. 1 illustrates a block diagram of a transit system, according to an embodiment of the present disclosure.

FIG. 1 illustrates a block diagram of a transit system 100, according to an embodiment of the present disclosure. Transit system 100 may include a plurality of gates 110 located at a plurality of locations 160. Each of locations 160 may include one or more of various means for entering transit system 100, such as a train or bus platform, a turnstile, a sliding door, a boom gate, and the like. Each of locations 160 may include a single or multiple gates 110, and in some embodiments each of gates 110 may include an entry point that defines a passageway and separates a non-restricted access area from a restricted access area. Each of gates 110 may be communicatively coupled to a network 140 via one or more wired and/or wireless connections. Network 140 may be communicatively coupled to a central processor 142 and a central data store via one or more wired and/or wireless connections. Central processor 142 may include a single or multiple processors, and may write, retrieve, or store data to central data store 144 or any of gates 110.

Figure 2:
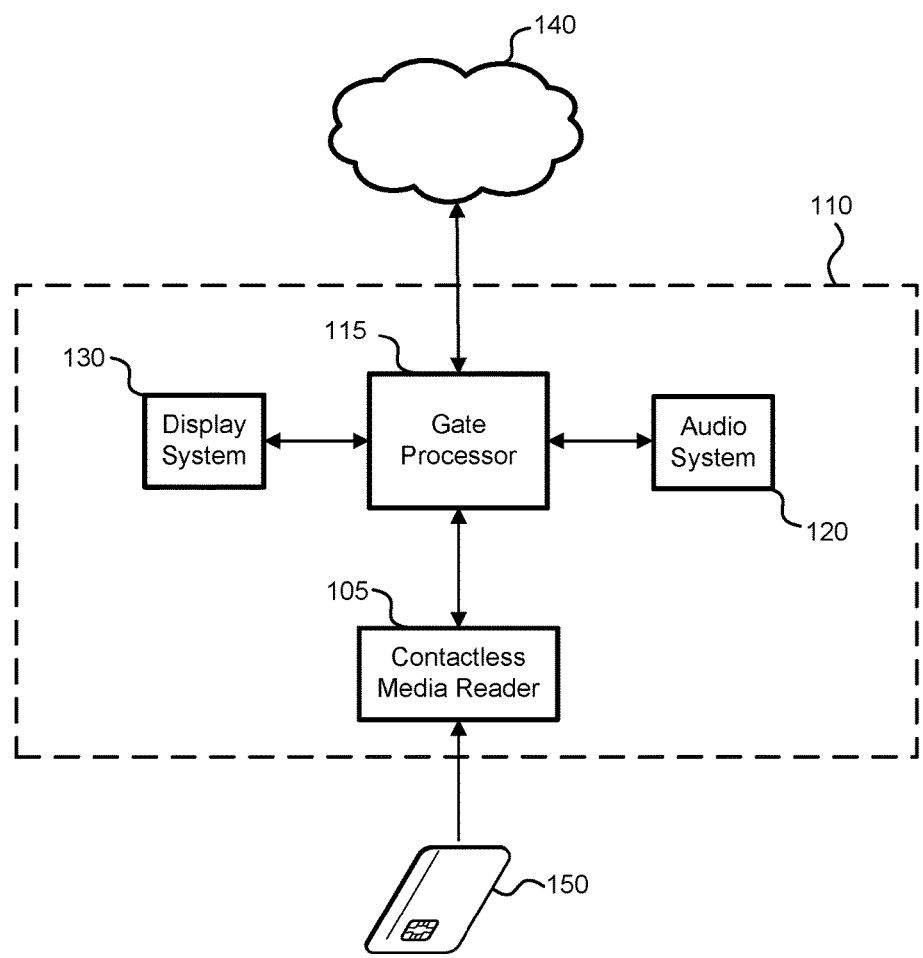
FIG. 2 illustrates a block diagram of a wireless communication object in communication with a gate in communication with a network, according to an embodiment of the present disclosure.

FIG. 2 illustrates a block diagram of a wireless communication object 150 in communication with gate 110 in communication with network 140, according to an embodiment of the present disclosure. Gate 110 may be used at the entry of transit system 100, entertainment venue, building, or any other metered entry. One of ordinary skill in the art will recognize that gate 110 can vary in appearance and functionality. In some embodiments, gate 110 includes a contactless media reader 105 whereby a wireless communication object 150 does not have to make contact with contactless media reader 105 to communicate. In some embodiments, gate 110 includes an audio system 120. Audio system 120 can give verbal instructions on using any of the components of gate 110. For instance, in some embodiments audio system 120 can alert the holder of wireless communication object 150 that wireless communication object 150 is not correctly placed to communicate with contactless media reader 105.

In some embodiments, gate 110 includes a gate processor 115 in communication with network 140. Gate processor 115 may include a single or multiple processors and an associated memory. Gate processor 115 may communicate with a display system 130 and provide the messaging presented on display system 130. Gate processor 115 can generate the messages to be displayed on display system 130 or receive the message to be displayed from any number of sources over network 140. Gate processor 115 may also communicate with audio system 120 and may generate the messages broadcast from audio system 120 or receive the message to be broadcast from any number of sources over the network 140. Gate processor 115 may communicate with contactless media reader 105 and may determine if wireless communication object 150 allows passage or may send information received from wireless communication object 150 over network 140 to central processor 142 to make the determination. In response to a communication error between contactless media reader 105 and wireless communication object 150, gate processor 115 may communicate with contactless media reader 105 and relay information from and to the other systems such as to audio system 120 to give an audio indication that wireless communication object 150 is not correctly placed or to display system 130 to show where wireless communication object 150 should be placed.

In some embodiments, gate 110 includes a display system 130. In some embodiments, display system 130 may display a message for the holder of wireless communication object 150 that the fare media is not in the correct place and can identify to the holder of wireless communication object 150 where to correctly place wireless communication object 150 to allow proper communication. In other embodiments display system 130 can display any manner of other messages including instructions for using gate 110, instructions for using transit system 100, and advertising. In some embodiments, gate 110 may include a media reader that requires contact with the object to be read. One of skill in the art will recognize that barriers associated with gate 110 would open up to allow the holder of wireless communication object 150 passage upon a successful communication between contactless media reader 105 and wireless communication object 150.

Communication between contactless media reader 105 and wireless communication object 150 may include any communication technology employing electromagnetic wireless signals. For example, the two devices may communicate using near-field communication (NFC), Bluetooth low energy (BLE), radio-frequency identification (RFID), and the like. In some embodiments, contactless media reader 105 may include an RFID reader and wireless communication object 150 may include an RFID tag. The RFID tag may be may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

Wireless communication object 150 may include (directly or indirectly via e.g., information linking to an external location) an amount of units which may be used to access transit system 100. For example, passage through different routes within transit system 100 may cause different amounts of units to be deleted from wireless communication object 150 (or from the external location). In some embodiments, central processor 142 or some external processor may cause some portion of the amount of units to be held as unavailable. When a portion of units is held as unavailable, that portion may not be used for other purposes outside transit system 100 such that the portion is locked from usage. In one particular implementation, the amount of units may correspond to money (e.g., a cash amount) usable for financial transactions such as purchase of a fare within transit system 100. In various embodiments, wireless communication object 150 may be a handheld electronic device such as a smart phone, personal digital assistant (PDA), or tablet, a credit card or debit card issued by an entity outside transit system 100, a fare media issued by transit system 100, and the like. For example, in some embodiments wireless communication object 150 may be any type of payment card (e.g., credit card, debit card, etc.).

Figure 3:
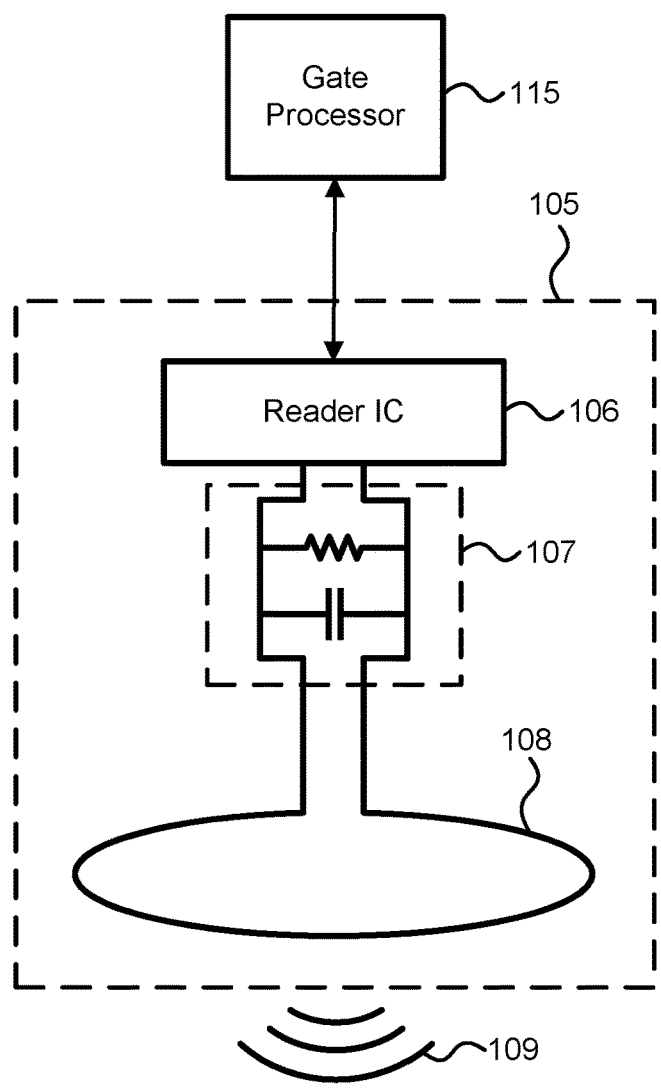
FIG. 3 illustrates a block diagram of a wireless communication object in communication with a contactless media reader in communication with a gate, according to an embodiment of the present disclosure.

FIG. 3 illustrates a block diagram of wireless communication object 150 in communication with contactless media reader 105 in communication with gate 110, according to an embodiment of the present disclosure. In some embodiments, contactless media reader 105 includes a reader integrated circuit (IC) 106, a tuned circuit 107, and an antenna 108. Tuned circuit 107 may include a resistor R and a capacitor C having values such that the circuit's resonant frequency corresponds to the carrier frequency of an interrogation signal 109 transmitted by contactless media reader 105 and/or the carrier frequency of an electromagnetic wireless signal 151 transmitted by wireless communication object 150. In some embodiments, the carrier frequencies of interrogation signal 109 and electromagnetic wireless signal 151 are the same. In such embodiments, contactless media reader 105 may transmit and receive using the same antenna, i.e., antenna 108. In some embodiments, antenna 108 is a loop antenna comprising a plurality of loops of wire. In some embodiments, the circumference of the loops of wire of antenna 108 is within a threshold distance of the wavelength of the carrier frequency of interrogation signal 109 transmitted by contactless media reader 105 and/or the carrier frequency of electromagnetic wireless signal 151 transmitted by wireless communication object 150. Other antenna 108 and tuned circuit 107 configurations are contemplated.

Figure 4A:
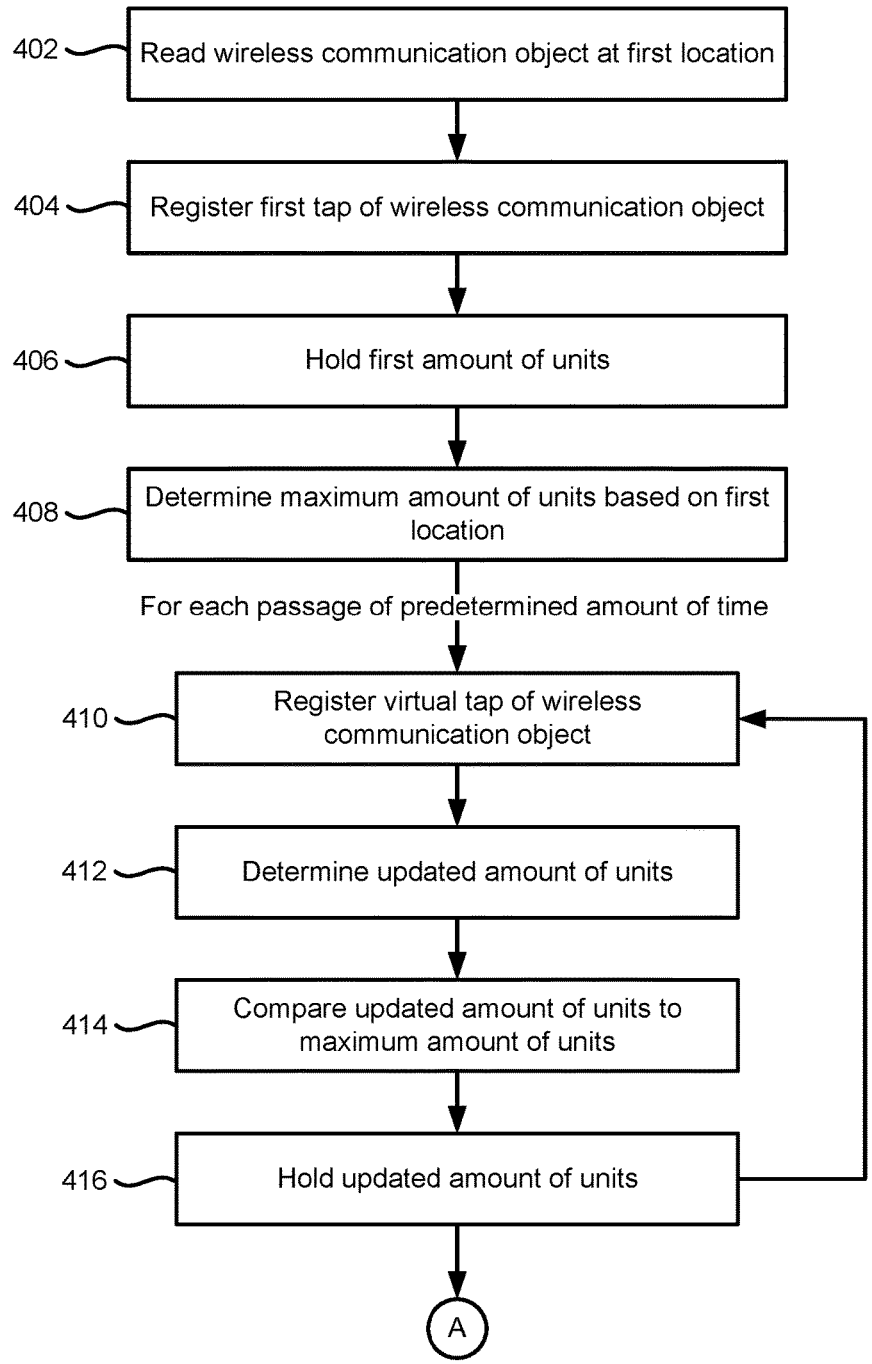
FIGS. 4A and 4B illustrate a method for modifying a wireless communication object during transit, according to an embodiment of the present disclosure.
Figure 4B:
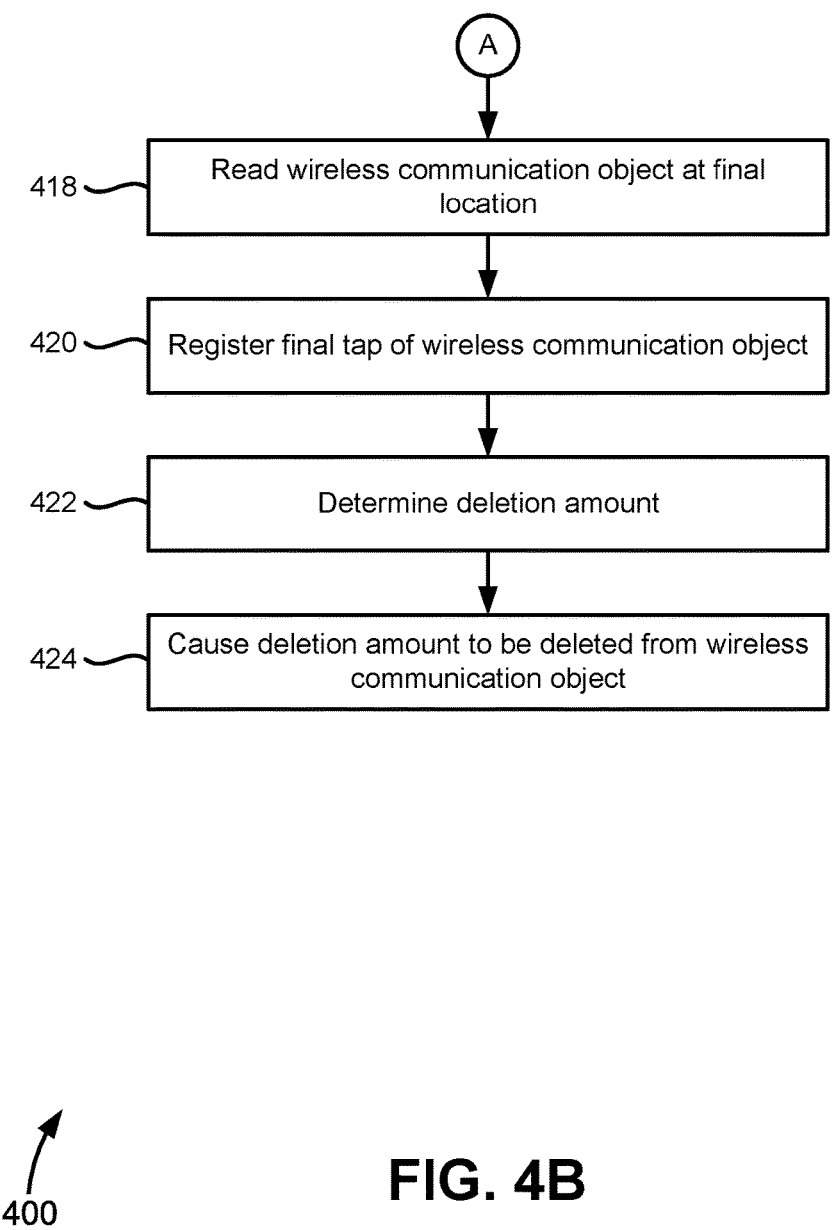

FIGS. 4A and 4B illustrate a method 400 for modifying wireless communication object 150 during transit, according to an embodiment of the present disclosure. Steps of method 400 need not be performed in the order shown, and not all steps of method 400 need be performed. One or more steps of method 400 may be performed by central processor 142, gate processor 115, contactless media reader 105, wireless communication object 150, or one by one or more processors external to transit system 100.

At step 402, wireless communication object 150 is read by a first contactless media reader at a first location within transit system 100 at a first time. Step 402 may include several sub-steps such as, for example, transmitting, by a loop antenna within the first contactless media reader, interrogation signal 109 to wireless communication object 150. Step 402 may also include receiving, by wireless communication object 150, interrogation signal 109. In some embodiments, upon receiving interrogation signal 109, wireless communication object 150 may modulate electromagnetic wireless signal 151 with information identifying wireless communication object 150 and transmit electromagnetic wireless signal 151 to the first contactless media reader. The first contactless media reader may receive electromagnetic wireless signal 151 at the first time and determine, based on the information modulated onto electromagnetic wireless signal 151, the user of wireless communication object 150, an identifier corresponding to wireless communication object 150, and/or an amount of units corresponding to wireless communication object 150.

At step 404, a first tap of wireless communication object 150 is registered. In some embodiments, registering the first tap of wireless communication object 150 includes storing the first location, the first time, and the identifier corresponding to wireless communication object 150 in a first entry within central data store 144. In some embodiments, the first location, the first time, and the identifier may be stored at different locations within central data store 144.

At step 406, a first amount of units is held as unavailable on wireless communication object 150 such that the first amount of units may not be used for other purposes outside transit system 100. Holding the first amount of units does not cause deletion of the first amount of units nor any permanent usage of the first amount of units. The first amount of units may be set to a predetermined value, such as 1, 5, 10, or 20 units, and/or may be selected based on the first location within transit system 100. In some embodiments, step 406 may also include determining whether wireless communication object 150 includes a sufficient amount of units (greater than the first amount of units). In response to determining that wireless communication object 150 does not include at least the first amount of units, an error message may be communicated (via audio system 120 and/or display system 130) and the holder of wireless communication object 150 may be denied entry into transit system 100.

At step 408, a maximum amount of units that may be used by the transit user is determined based on the first location. In some embodiments, step 408 is performed by determining a plurality of possible final locations within transit system 100 based on the first location, determining a plurality of fares between the first location and the plurality of possible final locations, and setting the maximum amount of units equal to the maximum value of the plurality of fares. Three different embodiments related to step 408 are described in reference to first, FIGS. 5A and 5B, second, FIGS. 6A and 6B, and third, FIGS. 7A, and 7B. In one particular implementation, step 408 is repeated upon determining a direction of travel of the transit user within transit system 100. The direction of travel may be determined based upon, for example, a location of the transit user as determined by a Global Navigation Satellite System (GNSS) receiver included in wireless communication object 150, among other possibilities. Upon determining the direction of travel of the transit user, step 408 may be repeated with the additional sub-step of eliminating a portion of the plurality of possible final locations within transit system 100 that are located in the opposite direction of the direction of travel. This sub-step may be repeated periodically or each time the direction of travel of the transit user is determined, among other possibilities. In one particular implementation, step 408 is repeated during performance of method 400 each and every time the direction of travel of the transit user changes (either by moving in a direction opposite to a previous direction of travel or by passing through a connecting point within transit system 100). In another particular implementation, step 408 is repeated each time the direction of travel of the transit user changes and/or each time step 410 is performed (a passage of a predetermined amount of time after the first time).

Steps 410 through 416 may each be performed for each passage of a predetermined amount of time after the first time. For example, in some embodiments the predetermined amount of time may be equal to 15 minutes such that each of steps 410 through 416 are performed 15 minutes after the first time, 30 minutes after the first time, 45 minutes after the first time, etc. In some embodiments, steps 410 through 416 are performed only a single time or less than 5 times. In some embodiments, steps 410 through 416 are repeated every 15 minutes until the holder of wireless communication object 150 exits transit system 100 at a final location. In some embodiments, the loop comprising steps 410 through 416 is aborted in response to performance of step 418.

At step 410, a virtual tap of wireless communication object 150 is registered at an update time. Continuing with the above example, the update time may be equal to 15 minutes after the first time, 30 minutes after the first time, 45 minutes after the first time, etc. In some embodiments, registering the virtual tap of wireless communication object 150 includes storing the update time and the identifier corresponding to wireless communication object 150 in an update entry (also referred to as a second entry, third entry, fourth entry, etc.) within central data store 144. In some embodiments, the update entry does not include a location within transit system 100.

At step 412, an updated amount of units (also referred to as a second amount of units, third amount of units, fourth amount of units, etc.) may be determined. The updated amount of units may be equal to the first amount of units plus additional units for each passage of the predetermined amount of time (iterations through steps 410 through 416). In some embodiments, the updated amount of units is incremented by a predetermined amount of units for each passage of the predetermined amount of time. For example, if the predetermined amount of units is equal to 10, the predetermined amount of time is equal to 15 minutes, and the first amount of units is equal to 10, then the updated amount of units may be equal to 20 approximately 15 minutes after the first time, 30 approximately 30 minutes after the first time, 40 approximately 45 minutes after the first time, etc. Other possibilities are contemplated.

At step 414, it is determined whether the updated amount of units is greater than or less than the maximum amount of units by comparing the two amounts. If it is determined that the updated amount of units is greater than the maximum amount of units, then the updated amount of units is decreased by the difference between the two such that the updated amount of units is set equal to the maximum amount of units. If it is determined that the updated amount of units is less than the maximum amount of units, then the updated amount of units is left unmodified and method 400 proceeds to either step 410 or step 418.

At step 416, the updated amount of units is held as unavailable on wireless communication object 150 such that the updated amount of units may not be used for other purposes outside transit system 100.

At step 418, wireless communication object 150 is read by a final contactless media reader at a final location within transit system 100 at a final time. Step 418 may include several sub-steps similar to those described in reference to step 402.

At step 420, a final tap of wireless communication object 150 is registered. In some embodiments, registering the final tap of wireless communication object 150 includes storing the final location, the final time, and the identifier corresponding to wireless communication object 150 in a final entry within central data store 144. In some embodiments, the final location, the final time, and the identifier may be stored at different locations within central data store 144.

At step 422, a deletion amount is determined based on the first location and the final location. For example, in some embodiments the deletion amount is determined via a lookup table stored in central data store 144. If the deletion amount is less than the updated amount of units, the difference between the two amounts is immediately released such that it is no longer being held as unavailable.

At step 424, the deletion amount is deleted from wireless communication object 150 or from an external location containing the previously held updated amount of units. In some embodiments, step 424 may include initiating a process such that the deletion amount is deleted from wireless communication object 150 within a period of time, e.g., 3 days.

Figure 5A:
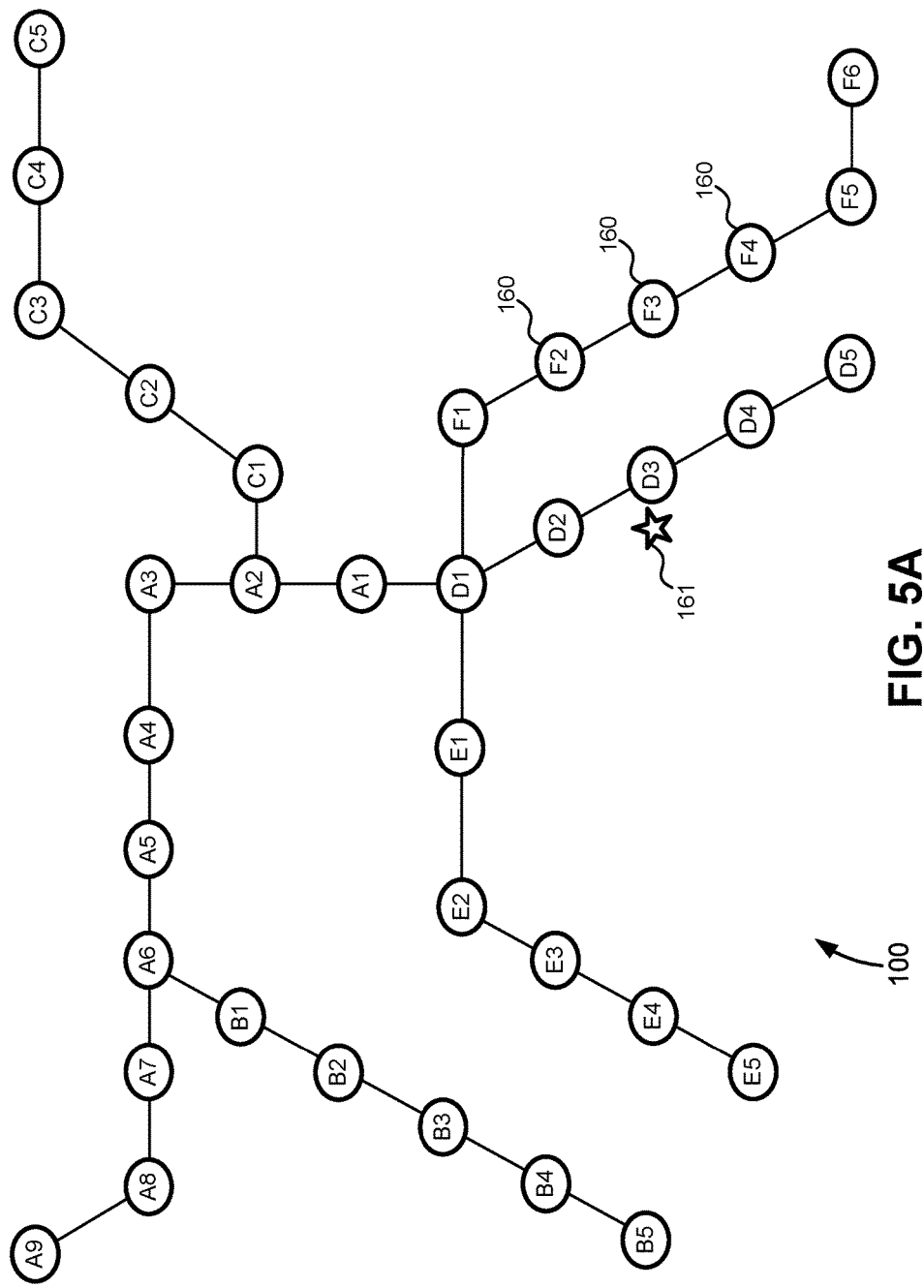

FIGS. 5A and 5B illustrate a method for determining the maximum amount of units that may be used by a transit user based on a current location 161 within transit system 100, according to an embodiment of the present disclosure. The method may include first identifying every location 160 within transit system 100 and determining the corresponding fare between current location 161 and each of the identified locations 160 within transit system 100. Next, the method may include determining a maximum value of the determined fares. As shown in table 500 of FIG. 5B, the maximum value of the determined fares is equal to 13. Finally, the maximum amount of units is set equal to the determined maximum value of the determined fares. Accordingly, the maximum amount of units is set equal to 13.

Figure 6A:
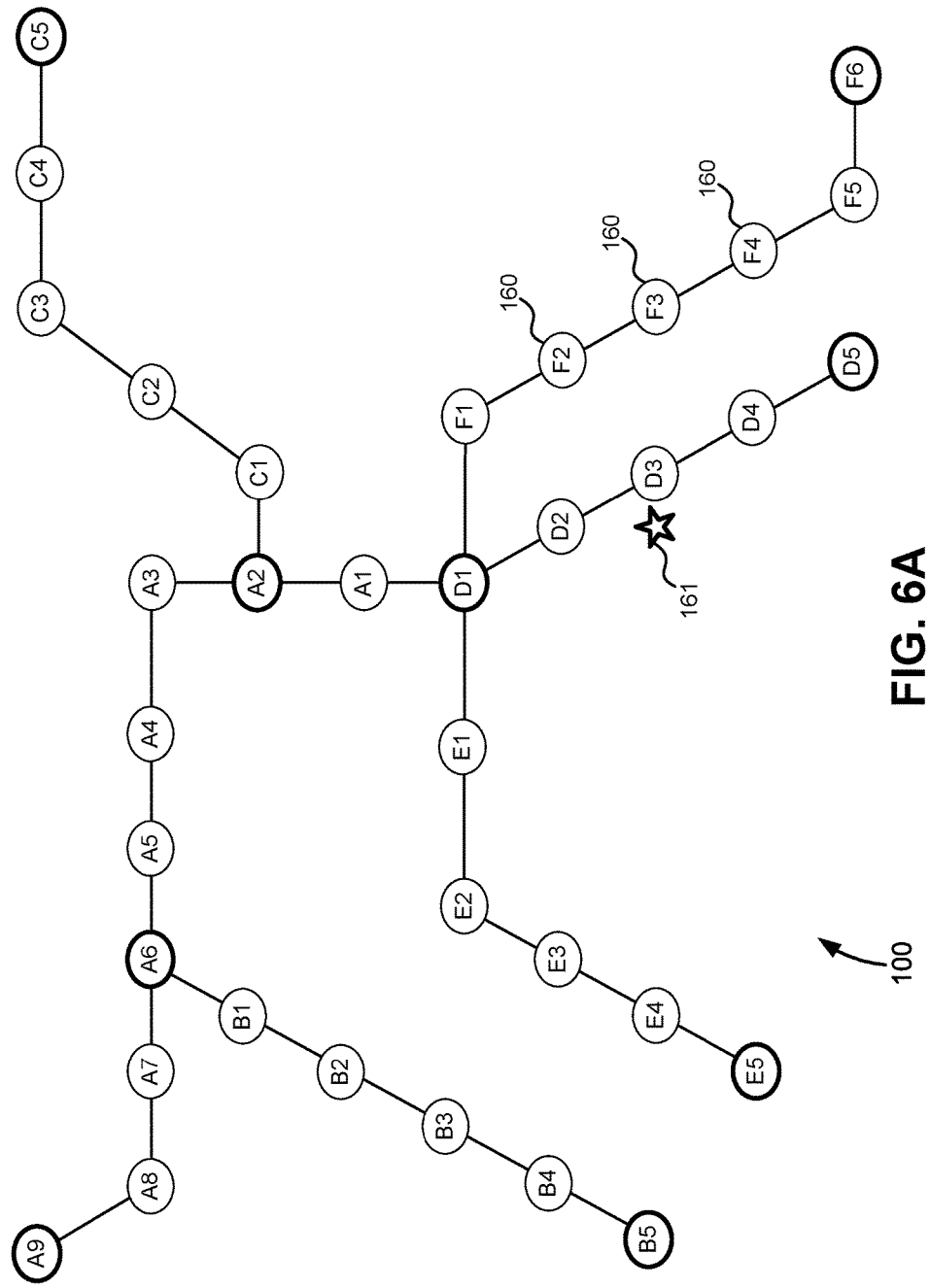
FIGS. 6A and 6B illustrate a method for determining the maximum amount of units that may be used by a transit user based on a current location within a transit system, according to an embodiment of the present disclosure.
Figure 6B:

FIGS. 6A and 6B illustrate a method for determining the maximum amount of units that may be used by a transit user based on a current location 161 within transit system 100, according to an embodiment of the present disclosure. The method may include first identifying every location 160 within transit system 100 that is either an end point (only has adjacent locations in one direction) or a connecting point (has adjacent locations in at least three directions) and determining the corresponding fare between current location 161 and each of the identified locations 160 within transit system 100. Next, the method may include determining a maximum value of the determined fares. As shown in table 600 of FIG. 6B, the maximum value of the determined fares is equal to 13. Finally, the maximum amount of units is set equal to the determined maximum value of the determined fares. Accordingly, the maximum amount of units is set equal to 13. The method described in reference to FIGS. 6A and 6B represents a streamlined approach of the method described in reference to FIGS. 5A and 5B.

Figure 7A:
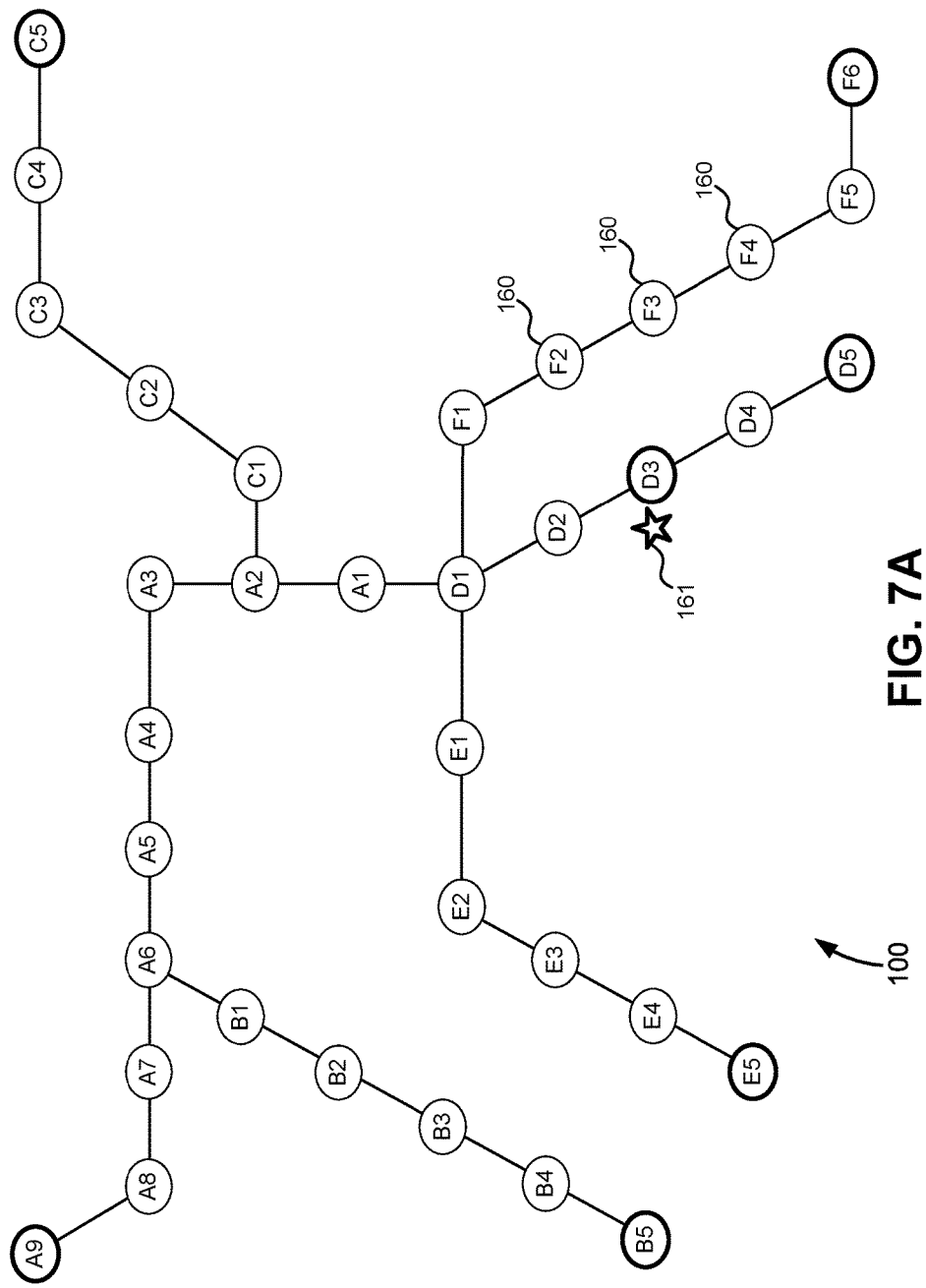
FIGS. 7A and 7B illustrate a method for determining the maximum amount of units that may be used by a transit user based on a current location within a transit system, according to an embodiment of the present disclosure.
Figure 7B:

FIGS. 7A and 7B illustrate a method for determining the maximum amount of units that may be used by a transit user based on a current location 161 within transit system 100, according to an embodiment of the present disclosure. The method may include first identifying every location 160 within transit system 100 that is an end point (only has adjacent locations in one direction) and determining the corresponding fare between current location 161 and each of the identified locations 160 within transit system 100. Next, the method may include determining a maximum value of the determined fares. As shown in table 700 of FIG. 7B, the maximum value of the determined fares is equal to 13. Finally, the maximum amount of units is set equal to the determined maximum value of the determined fares. Accordingly, the maximum amount of units is set equal to 13. The method described in reference to FIGS. 7A and 7B represents a streamlined approach of the methods described in reference to FIGS. 5A, 5B, 6A, and 6B.

Figure 8:
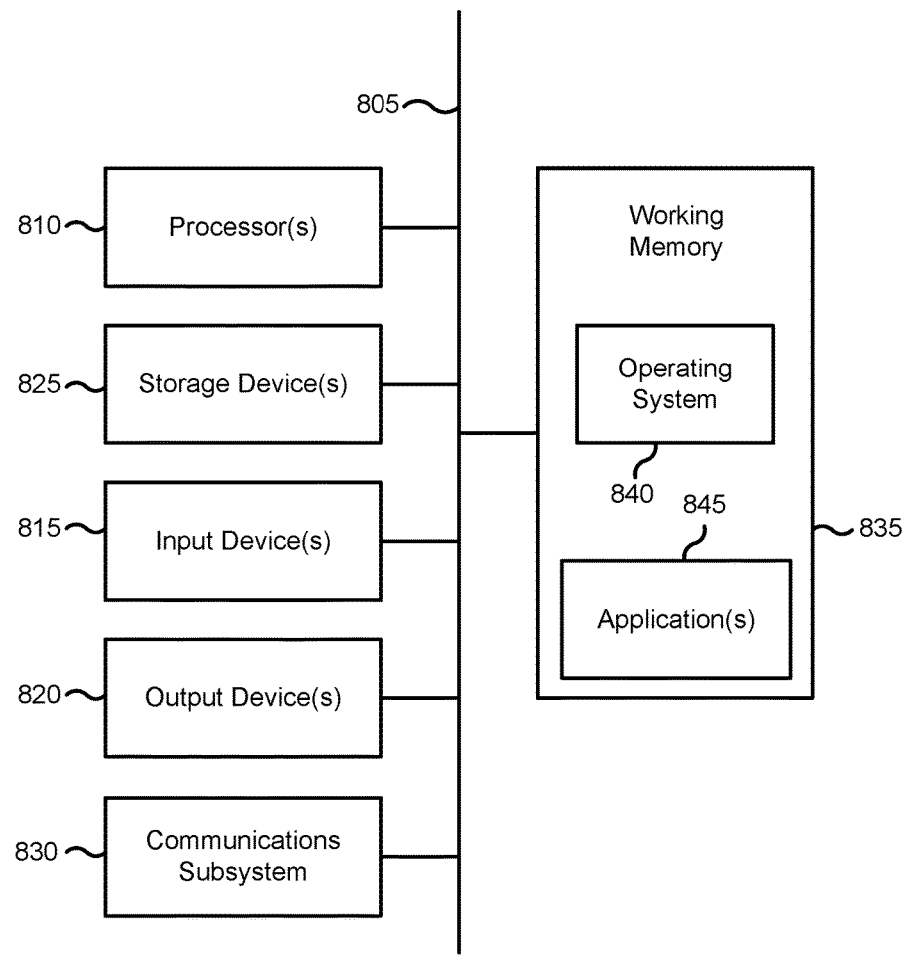
FIG. 8 illustrates a simplified computer system, according to an embodiment of the present disclosure.

FIG. 8 illustrates a simplified computer system 800, according to an embodiment of the present disclosure. Computer system 800 may be incorporated as part of the previously described computerized devices. For example, computer system 800 can represent some of the components of central processor 142, gate processor 115, contactless media reader 105, wireless communication object 150, and the like. FIG. 8 provides a schematic illustration of one embodiment of a computer system 800 that can perform the methods provided by various other embodiments, as described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include a processing unit 810, including without limitation one or more general-purpose processors and/or one or more special-purpose processors (such as digital signal processing chips, graphics acceleration processors, and/or the like); one or more input devices 815, which can include without limitation a keyboard, a touchscreen, receiver, a motion sensor, a camera, a smartcard reader, a contactless media reader, and/or the like; and one or more output devices 820, which can include without limitation a display device, a speaker, a printer, a writing module, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communication interface 830, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 810, applications 845, etc.) Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processing unit 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication interface 830 (and/or the media by which the communication interface 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processing unit 810.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for holding units associated with a wireless communication object as unavailable during transit, the method comprising:
    registering a first tap of the wireless communication object by reading the wireless communication object at a first location within a transit system at a first time;
    in response to registering the first tap, holding a first amount of units associated with the wireless communication object as unavailable; and
    for each passage of a predetermined amount of time after the first time:
       registering a virtual tap of the wireless communication object at an update time;
       determining an updated amount of units; and
       holding the updated amount of units associated with the wireless communication object as unavailable.

2. The method of claim 1, further comprising:
    registering a final tap of the wireless communication object by reading the wireless communication object at a final location within the transit system at a final time;
    determining a deletion amount based on the first location and the final location; and
    causing the deletion amount to be deleted from the units associated with the wireless communication object.

3. The method of claim 1, further comprising:
    determining a maximum amount of units based on the first location within the transit system; and
    for each passage of the predetermined amount of time from the first time:
       determining whether the updated amount of units is greater than the maximum amount of units; and
       in response to determining that the updated amount of units is greater than the maximum amount of units, decreasing the updated amount of units to the maximum amount of units.

4. The method of claim 3, wherein determining the maximum amount of units based on the first location within the transit system includes:
    determining a plurality of final locations within the transit system based on the first location;
    determining a plurality of fares between the first location and the plurality of final locations; and
    setting the maximum amount of units equal to a maximum of the plurality of fares.

5. The method of claim 1, wherein:
    registering the first tap of the wireless communication object includes storing the first location, the first time, and an identifier corresponding to the wireless communication object in a first entry at a data store; and
    registering the virtual tap of the wireless communication object includes storing the update time and the identifier corresponding to the wireless communication object in an update entry at the data store, and wherein the update entry does not include a location within the transit system.

6. The method of claim 1, wherein the predetermined amount of time is 30 minutes such that the virtual tap of the wireless communication object is registered every 30 minutes after the first time.

7. The method of claim 1, wherein reading the wireless communication object at the first location includes receiving, by an antenna within a first reader at the first location, an electromagnetic wireless signal, wherein the electromagnetic wireless signal is modulated by the wireless communication object with information identifying the wireless communication object.

8. The method of claim 7, further comprising:
transmitting, by the antenna, an interrogation signal to the wireless communication object, wherein the interrogation signal causes the wireless communication object to transmit the modulated electromagnetic wireless signal.

9. The method of claim 1, wherein the wireless communication object is a fare media issued by the transit system.

10. The method of claim 1, wherein the wireless communication object is a mobile electronic device.

11. The system of claim 1, wherein the units associated with the wireless communication object, the first amount of units associated with the wireless communication object, and the updated amount of units associated with the wireless communication object are monetary amounts.

12. A system for holding units associated with a wireless communication object as unavailable during transit, the system comprising:
one or more processors;
one or more computer readable storage mediums comprising instructions that, when executed by the one or more processors, cause the one or more processors to perform operations comprising:
registering a first tap of the wireless communication object by reading the wireless communication object at a first location within a transit system at a first time;
in response to registering the first tap, holding a first amount of units associated with the wireless communication object as unavailable; and
for each passage of a predetermined amount of time after the first time:
registering a virtual tap of the wireless communication object at an update time;
determining an updated amount of units; and
holding the updated amount of units associated with the wireless communication object as unavailable.

13. The system of claim 12, wherein the operations further comprise:
registering a final tap of the wireless communication object by reading the wireless communication object at a final location within the transit system at a final time;
determining a deletion amount based on the first location and the final location; and
causing the deletion amount to be deleted from the units associated with the wireless communication object.

14. The system of claim 12, wherein the operations further comprise:
determining a maximum amount of units based on the first location within the transit system; and
for each passage of the predetermined amount of time from the first time:
determining whether the updated amount of units is greater than the maximum amount of units; and
in response to determining that the updated amount of units is greater than the maximum amount of units, decreasing the updated amount of units to the maximum amount of units.

15. The system of claim 14, wherein determining the maximum amount of units based on the first location within the transit system includes:
determining a plurality of final locations within the transit system based on the first location;
determining a plurality of fares between the first location and the plurality of final locations; and
setting the maximum amount of units equal to a maximum of the plurality of fares.

16. The system of claim 12, wherein:
registering the first tap of the wireless communication object includes storing the first location, the first time, and an identifier corresponding to the wireless communication object in a first entry at a data store; and
registering the virtual tap of the wireless communication object includes storing the update time and the identifier corresponding to the wireless communication object in an update entry at the data store, and wherein the update entry does not include a location within the transit system.

17. The system of claim 12, wherein the predetermined amount of time is 30 minutes such that the virtual tap of the wireless communication object is registered every 30 minutes after the first time.

18. The system of claim 12, wherein reading the wireless communication object at the first location includes receiving, by an antenna within a first reader at the first location, an electromagnetic wireless signal, wherein the electromagnetic wireless signal is modulated by the wireless communication object with information identifying the wireless communication object.

19. The system of claim 18, wherein the operations further comprise:
transmitting, by the antenna, an interrogation signal to the wireless communication object, wherein the interrogation signal causes the wireless communication object to transmit the modulated electromagnetic wireless signal.

20. The system of claim 12, wherein the wireless communication object is a fare media issued by the transit system.

* * * * *